Dec. 13, 1966  C. L. DELLINGER  3,291,541
COMBINED PILLOW BLOCK AND BEARING ASSEMBLY
Filed Dec. 27, 1963  3 Sheets-Sheet 1
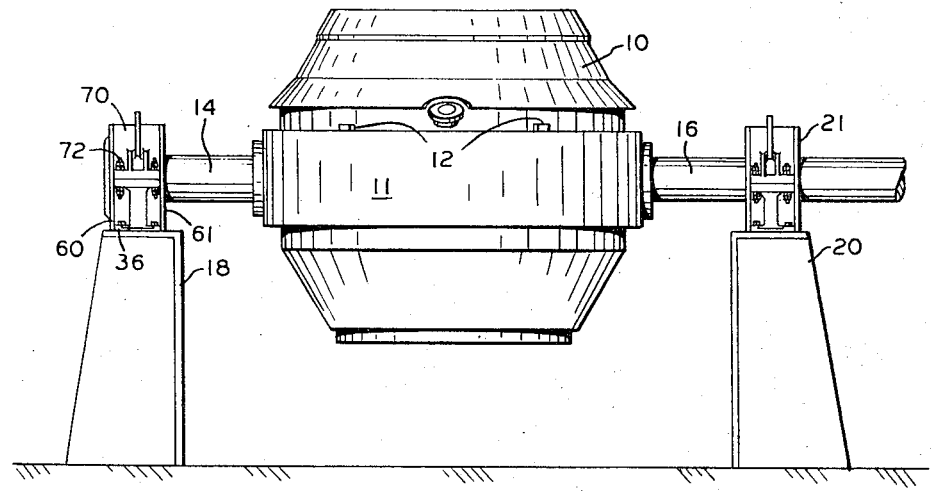
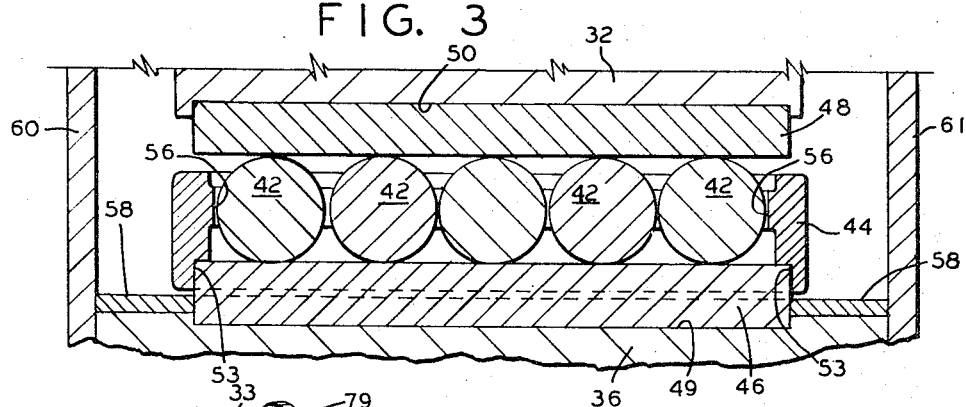
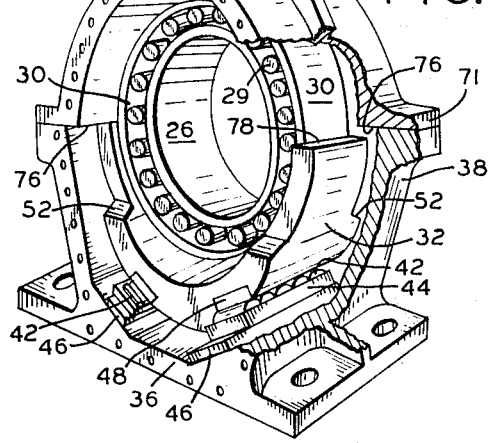
INVENTOR.
CARL L. DELLINGER
BY John P. Chandler
HIS ATTORNEY.

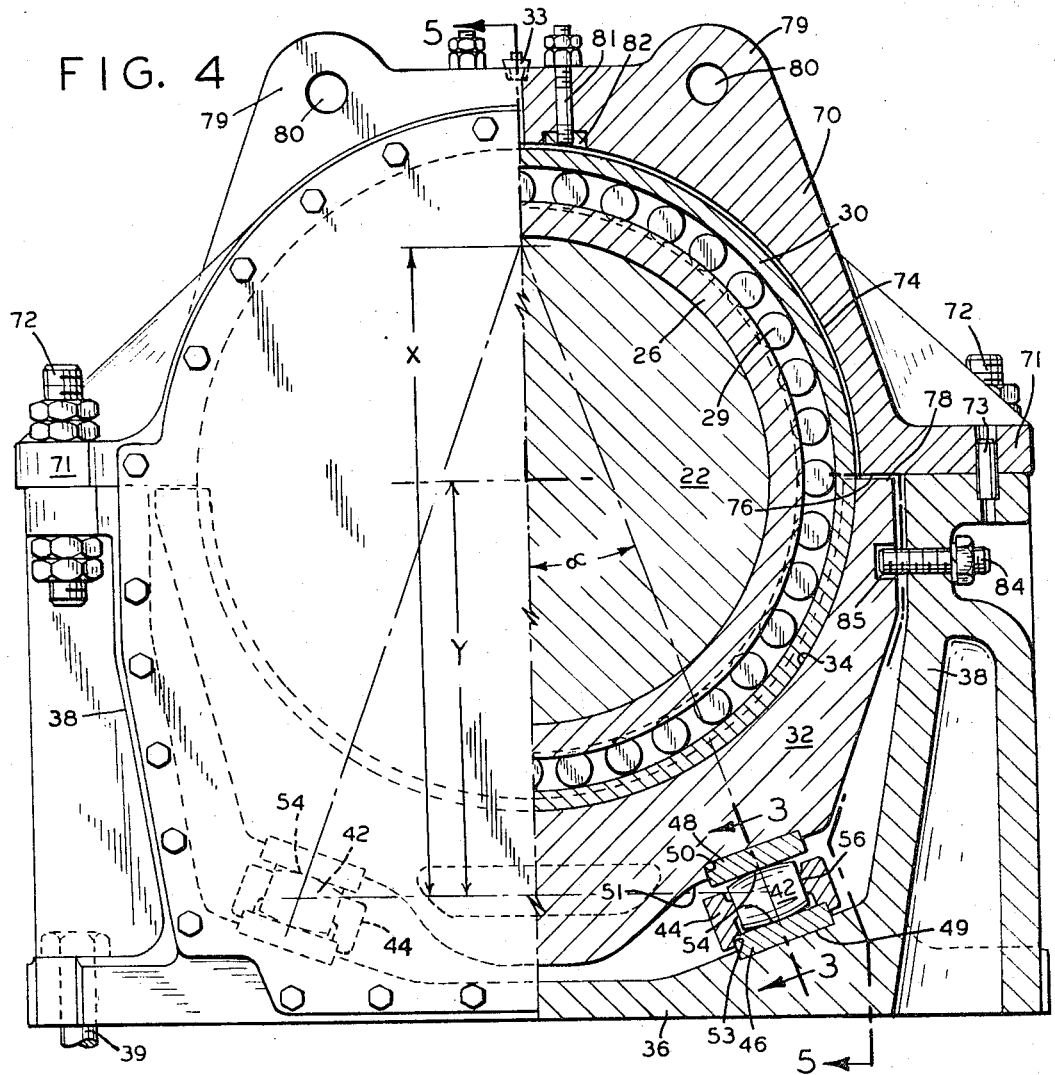

Dec. 13, 1966   C. L. DELLINGER   3,291,541
COMBINED PILLOW BLOCK AND BEARING ASSEMBLY
Filed Dec. 27, 1963   3 Sheets-Sheet 3

INVENTOR.
CARL L. DELLINGER
BY John P. Chandler
HIS ATTORNEY.

United States Patent Office 3,291,541
Patented Dec. 13, 1966

3,291,541
COMBINED PILLOW BLOCK AND BEARING ASSEMBLY
Carl L. Dellinger, Norwalk, Conn., assignor to Universal American Corporation, New York, N.Y.
Filed Dec. 27, 1963, Ser. No. 333,968
12 Claims. (Cl. 308—6)

This invention relates to bearing assemblies for shafts which expand longitudinally under the influence of extreme heat, and relates more particularly to a pillow block and bearing assembly for the trunnion on the expansion side of a furnace using the basic oxygen process in steel making and employing a vessel which is subjected to rotary or turning movement in its utilization.

In the basic oxygen process for making steel, the molten iron produced in the blast furnace is further processed in a converter which is a huge vessel, generally mounted in a rugged trunnion ring with aligned trunnions extending on each side, one or both of which is driven when the vessel is rotated for pouring. One trunnion shaft is axially fixed for locating the vessel and the other has means for taking care of expansion along the axis, due to the intense heat. In some cases the trunnions are affixed directly to the vessel.

Converter practice is rough and all mechanical parts are exposed to very punishing conditions, including the dust and particles from the converter which get into trunnion bearings as the efficiency of the seals begins to deteriorate.

The pillow block and bearing assembly of the present invention may be used with any suitable furnaces but it is particularly useful in the more modern field of oxygen furnaces of large capacity. Linear motion bearings together with two spherical roller bearings, represent the ideal method of taking both axial expansion and shaft misalignment. Linear bearings, however, are difficult to seal and, when mounted horizontally, can resist none of the lateral shock due to deskulling operations. They also require pillow blocks and pedestals of elaborate and massive configuration in order that the flat races are not distorted and that no pinching occurs in the spherical bearings.

An important object of the present invention is to provide a system of mounting a bearing pillow block in inclined linear bearings to resist lateral forces to support the pillow block under an area of high moment loading and to provide stability against overturning by means of a positive stop. It has been suggested in McFeeters Patent No. 2,976,090 that the pillow block be mounted on linear or flat race bearings with the rollers on a horizontal plane but such an arrangement cannot resist lateral shock loads through the rollers due to deskulling operations which are required at frequent intervals and which can subject the bearings to greater punishment than any other influence during their useful life.

If the linear motion roller bearings are inclined inwardly, i.e., so that a line normal to the axes of their rollers meet at about the axis of the trunnions, there is a low resistance to purely torsional forces although there is a substantial resistance to lateral shock loads. In such an arrangement, the axis of each set of rollers in the linear bearings would be normal to the radius of the trunnion at the point of tangency. This angular relation does not afford sufficient resistance to purely torsional forces which would be resisted most effectively if the axis of the rollers were horizontal. In other words, the arrangement whereby the intersection of the vertically inclined axis, normal to the axis of the rollers of the linear bearing, meet at the centerline of the shaft, would tend to make this unit self-aligning and hereby easily skewed on the linear bearings under a torsional load. I have discovered, however, that if the lines normal to the axis of the rollers, of the linear motion bearings, intersect at a point above the horizontal axis through the trunnions, increased stability against torsional loads is obtained. I have further discovered that this point of intersection of the lines normal to the axis of the linear bearing rollers and converging above the horizontal axis through the trunnions must have a definite proportional height with respect to the overall dimensions. This height X must lie between 105% and 285% of the vertical distance Y which is defined as the distance between the horizontal centerline of the trunnions and a horizontal plane connecting the centers of the linear bearings. I have further discovered that if the angle α between a line normal to the axis of the rollers on each side of a vertical center line is about 20° the most desirable results are achieved and with this relation the linear bearings can be spread widely enough to give a stable mounting. This angle should not be more than 45° nor less than 10° depending upon the amount of horizontal shock loads anticipated in a given installation.

Another object of the invention is to provide a novel floating bearing assembly on large converters which takes care of most misalignment problems in bearings of this character, which are dependent upon many variables, not easily predicted and due to such factors as static and dynamic deflection and distortion due to intense heat.

A further object of the invention is to provide an improved sealing arrangement to take care of the tremendous amount of dust blown into the surrounding atmosphere during every heat plus occasioning bits of molten slag or metal that get past the fire wall or shroud.

Yet another object of the invention is to provide an improved bearing assembly for the purpose described which will give trouble free operations over long periods of time with a minimum of maintenance and overhaul, and which will not induce undue strain on the vessel when accommodating expansion.

Another object of the invention is to provide a novel arrangement for enclosing both the main trunnion bearings, which preferably are spherical roller bearings, and the linear motion bearings, in a single, effectively sealed housing.

In the drawings:

FIG. 1 is a front elevation of an oxygen converter vessel with opposed aligned trunnions supported in bearing structures;

FIG. 2 is a perspective view of the pillow block and bearing structure of the present invention;

FIG. 3 is a broken section taken on line 3—3 of FIG. 4;

FIG. 4 is an end elevation of the pillow block and showing one of the covers broken away;

Figure 5:
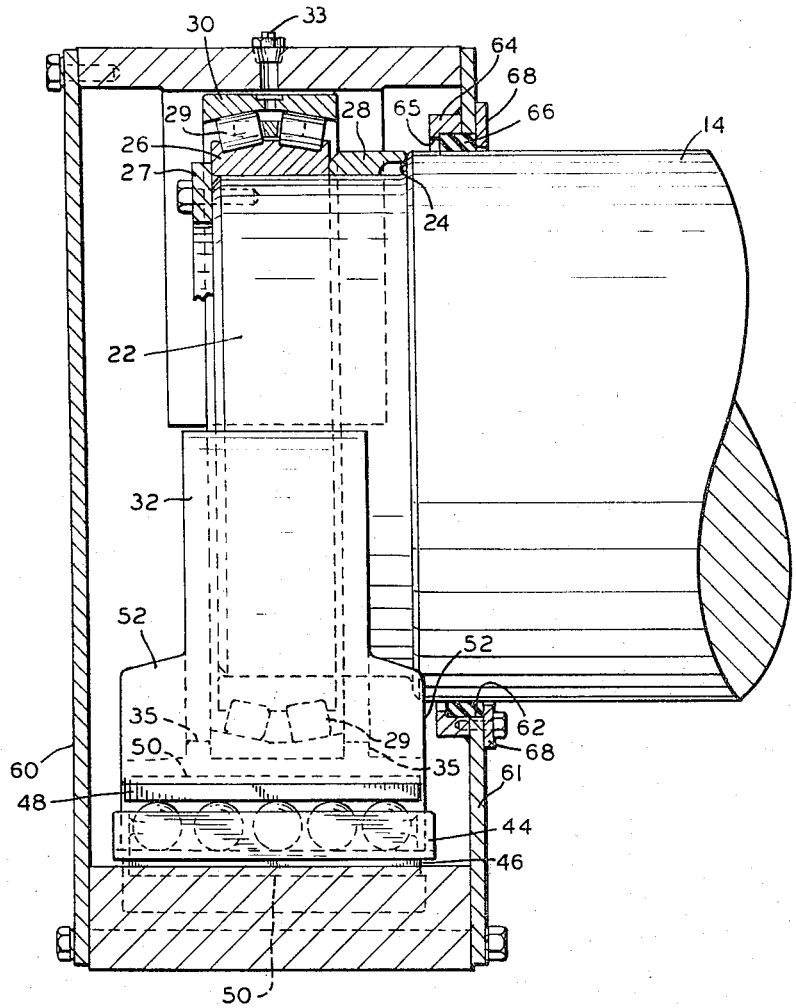
FIG. 5 is a section taken on line 5—5 of FIG. 4.

FIG. 1 shows a vessel or furnace 10 which is positioned within a trunnion ring 11. Downward movement of the vessel is limited by the fixed stops 12 secured at appropriate intervals around the upper section of the vessel. The ring is provided with axially aligned trunnions, one of which, shown at 14, is on the outer or expansion side of the vessel, and the other, shown at 16, is one the driven or fixed side. The expansion side has a lower vertical pedestal 18 and an upper pillow block formed with base frame 36 and a cap 70 which encapsulates the bearing assemblies of the present invention. The driven side also has lower and upper stands 20 and 21, the latter having suitable bearings (not shown) with which the present invention is not concerned. The trunnion 14 has a terminal section 22 of reduced diameter forming a shoulder 24. An inner race ring 26 is fitted on this terminal section and abuts against a spacer 28 whose opposite end contacts shoulder 24. A retainer ring 27 secures the race in place. Two rows of spherical rollers 29 are received in annular recesses in the outer periphery of the inner race ring and an outer race ring 30 has appropriate inner faces engaged by the two rows of rollers. A plug 33 is removable in order to provide for lubrication.

The outer ring is supported over its lower half by a saddle 32 having a semi-circular bed 34 to effectively position and contain said outer ring and spaced annular flanges 35 to prevent movement of said lower half of the outer race ring in an axial direction. The saddle is supported in a base frame 36 having upwardly extending sides 38 and arranged to be secured to the floor stand 18 by bolts 39. The saddle is supported for limited travel in a direction parallel with the axis of the trunnions by a pair of linear motion roller bearings. The angle between the axes of the rollers 42 in each linear bearing assembly and a vertical center line passing through the axis of the trunnions is critical as was earlier pointed out. Also critical is the point on said vertical center line where these two lines, normal to the axes of the rollers, intersect. Each linear bearing assembly includes a rectangular cage 44, a bottom plate 46 and a top plate 48. The bottom plate 46 is received in a recess 49 in the base frame and the top plate 48 is received in a recess 50 in a diagonal lower face 51 of the saddle. It will be noted that the saddle flares outwardly at its lower end on both sides as shown at 52 in order to permit the linear bearings to have an approved length.

The rectangular cage has lower internal recesses 53 extending along both sides and is thus fitted on the bottom plate (FIG. 4) in order to orient the rollers with respect to each other and to prevent the entire assembly from shifting laterally. Rollers of cylindrical shape would produce misalignment problems and for this reason the rollers are crowned as shown at 54 in FIG. 4 so that under conditions of maximum misalignment the contact eclipse does not reach the roller corners, thus preventing edge loading. The rollers have flat end faces which engage a flat rib 56 extending around the four sides of the cage, the rib providing an area of approved width to engage these end faces and also the curved sides of the terminal rollers. This rib is readily machined to a required dimension, giving the rollers sufficient clearance for free rotation without too much freedom. It will be noted in FIG. 3 that there is slightly more clearance between the peripheries of the rollers than between the end faces and the ribs along the sides of the cage.

The bottom plate 46 engages spacer plates 58 which are confined by an outer end cover plate 60 and an inner end cover plate 61, the latter having an opening 62 for trunnion 14. In order to seal the bearing assembly including the main spherical roller bearings and the inclined linear motion bearings against dust and dirt, there is a seal cartridge 64 secured as by welding to the inner face of inner end plate 61, said cartridge having a shoulder 65 to confine a resilient seal ring 66. A retaining ring 68 forms an outer wall for the cartridge to secure the seal ring therein.

A cap 70 formed with lugs 71 is secured atop the upwardly inclined sides 38 of base frame 36 by bolts 72 and positioned by a dowel 73, said cap having a clearance shown at 74 between its inner face and the upper half of the outer race ring 30 in order to permit said ring to move axially relative to said cap, which is fixed, and thus provide a true anti-friction design between these parts. The lugs 71 have lower faces 76 and the inner ends 76 of those lower faces form positive stops which can be engaged by the upper ends 78 of saddle 32 should any unusual torsional or shock forces tend to unseat the saddle and attempt to roll or lift it right out of its base support. These positive steps are most important since if any forces should develop making its use necessary its absence would cause considerable damage to the entire assembly. The antifriction design mentioned above is further carried out in the provision of the space shown between these upper ends 78 of the saddle and the stops formed by the lower faces 76 of the cap. This space though small is very important because it allows for relative sliding movement of the face 76–78 without friction.

The cap is equipped with cast ears 79 having holes 80 for lifting purpose. During shipping, it is desirable to prevent any upward movement of the outer race 30 which, as aforesaid, has a clearance with the inner concave face of cap 70. This is accomplished by set screws 81 attached to pressure plates 82. When these set screws are tightened and plates 82 press against the outer ring they can effectively distort and internally preload the main spherical roller bearing in addition to preloading the linear motion bearings to prevent undue vibration which causes damage known as false brinelling or friction oxidation or fretting corrosion. These screws are shown as located in spaced relation to the vertical center line of the assembly and when they are tightened against ring 30 they cause some part of the outer race to bulge at points other than the points of contact and thus remove the diametral clearance from the bearing. Thus, the clearance 74 between the cap and the outer section of outer race 30, allowing for axial movement of race 30, relative to the saddle also has a second function, namely to allow for this bulging to occur when the ring is temporarily deformed out of its round shape. The saddle may also be secured to the base during shipping by screws 84 passing into apertures 85 to prevent any axial motion even though in a preloaded condition. Also, they further have the advantage of holding the saddle during assembly installation.

While there have been described herein what are at present considered preferred embodiments of the invention, it will be obvious to those skilled in the art that many modifications and changes may be made therein without departing from the essence of the invention. It is therefore to be understood that the exemplary embodiments are illustrative and not restrictive of the invention, the scope of which is defined in the appended claims, and that all modifications that come within the meaning and range of equivalency of the claims are intended to be included therein.

What I claim is:

1. A combined pillow block and bearing assembly for a shaft which is subject to axial expansion as well as rotation, a roller bearing with continuous inner and outer races carried on a shaft, a saddle supporting the lower half of the outer race, a base frame supporting the saddle and a pair of spaced, linear motion bearing assemblies mounted between the saddle and the base frame providing for axial travel of the saddle, each latter bearing having a rectangular cage mounted in fixed relation on the frame and rollers in the cage engaging the saddle, lines normal to the axes of the rollers in said bearings intersecting each other above the axis of said shaft, a cap rigidly secured to and closing the upper end of the base frame and provided with an inner surface, which has the same contour as but is slightly spaced from the outer surface of the outer race, lugs being provided at its lower end with stops overlying the upper ends of the saddle and limiting rotation of the saddle in the base frame, and encapsulating means enclosing the roller bearings, the linear motion bearings and the adjoining end of the shaft.

2. The structure recited in claim 1 wherein the angular relation between each of said lines normal to the axis, and a vertical center line passing through the shaft axis, is not more than 45° and not less than 10°.

3. The structure recited in claim 2 wherein said angular relation is about 20°.

4. The structure recited in claim 1 wherein the distance X between the point of intersection of both of said lines normal to the axis is not less than 105% nor more than 285% of the vertical distance Y which is defined as the distance between the horizontal centerline of the shaft and a horizontal plane connecting the centers of the linear bearings.

5. The structure recited in claim 1 wherein screw means are provided for forcing the outer race of the roller bearing against the inner race during transportation to preload all the bearings in the assembly and prevent vibration between the parts.

6. A combined pillow block and bearing assembly for a shaft which is subject to axial expansion as well as rotation, a roller bearing with inner and outer races carried on a shaft, a saddle supporting the lower half of the outer race, a U-shaped base frame supporting the saddle, and a pair of spaced, linear motion bearing assemblies mounted between the saddle and the base frame permitting axial travel of the saddle, each latter bearing having a rectangular cage mounted in fixed relation on the frame and crowned rollers in the cage engaging the saddle, a line perpendicular to the axis of the rollers in each bearing having an angular relation to a central vertical line through the shaft axis of about 20°, a semi-circular cap enclosing the upper half of said outer race and whose inner surface has a concave contour conforming to but closely spaced from said upper half, said cap being formed at its lower end with lugs having flat lower faces rigidly secured at the upper end of the U-shaped base frame and thereby becoming an integral part of the base frame, said flat faces of the lugs having sections extending radially inwardly over the tops of the saddle and forming stops limiting rotation of the saddle on its linear bearing support which may be caused by lateral shock loads, one of said plates having an opening for the shaft and provided with sealing means for the shaft.

7. In a heated vessel supported by a pair of oppositely extending trunnions, an anti-friction bearing for the trunnion on a driving side, the combination of a combined pillow block and bearing assembly for the other trunnion on an expansion side to allow for turning of the vessel for pouring, and a floating bearing allowing for axial expansion, said assembly including a roller bearing with continuous inner and outer races carried on said latter trunnion, a saddle provided with an arcuate seat supporting the lower half of the outer race, a generally U-shaped base frame supporting the saddle, and a pair of linear motion bearings with rollers mounted in spaced relation between the lower side of the saddle and the upper central face of the base frame to allow for axial movement of the saddle and said trunnion, a cap rigidly mounted at the upper end of the saddle and having an arcuate face enclosing, but being spaced from, the upper half of said outer race, said cap being formed at its lower end with inwardly extending faces normally spaced from the upper ends of the saddle but forming stops limiting rotation of the saddle in its linear bearing support which may be caused by lateral shock loads, a line normal to the axis of the rollers in each linear motion bearing having an angular relation with a central vertical line passing through the trunnion axis of not less than 10° nor more than 45°.

8. The structure recited in claim 7 wherein said angular relation is about 20°.

9. The structure recited in claim 7 wherein the distance X between the point of intersection of both of said lines normal to the axis is not less than 105% nor more than 285% of the vertical distance Y which is defined as the distance between the horizontal centerline of the shaft and a horizontal plane connecting the centers of the linear bearings.

10. The structure recited in claim 7 wherein screw means are carried by said cap for forcing the outer race of the roller bearing against the inner race during transportation to preload all the bearings in the assembly and prevent vibration between the parts.

11. The structure recited in claim 7 wherein said lines normal to the axis intersect at a point above the trunnion axis.

12. The structure recited in claim 7 wherein the arcuate seat in the saddle has spaced flanges for positioning the outer race rings.

References Cited by the Examiner

UNITED STATES PATENTS

| | | | |
|---|---|---|---|
| 1,243,049 | 10/1917 | Dewey | 308—176 |
| 1,358,420 | 10/1920 | Dallimore | 308—162 |
| 1,458,187 | 6/1923 | Hudson | 308—183 |
| 1,747,609 | 2/1930 | Treschow | 308—73 |
| 2,138,601 | 11/1938 | Herrmann | 308—207 |
| 2,506,525 | 5/1950 | Thomas | 308—207 |
| 2,556,317 | 6/1951 | Cook | 308—143 |
| 2,761,295 | 9/1956 | Davis | 64—1 |
| 2,964,250 | 12/1960 | Asplund | 308—176 X |
| 2,976,090 | 3/1961 | McFeeters | 308—6 |
| 3,070,039 | 12/1962 | Mohr | 308—245 X |
| 3,170,737 | 2/1965 | Denne | 308—59 |

EDGAR W. GEOGHEGAN, *Primary Examiner.*

DAVID J. WILLIAMOWSKY, *Examiner.*

L. L. JOHNSON, *Assistant Examiner.*